United States Patent
Derangere et al.

(10) Patent No.: US 12,170,380 B2
(45) Date of Patent: Dec. 17, 2024

(54) BATTERY MODULE FOR A MOTOR VEHICLE

(71) Applicant: Plastic Omnium Clean Energy Systems Research, Lyons (FR)

(72) Inventors: Nicolas Derangere, Brussels (BE); Franck Dhaussy, Brussels (BE); Pierre Oszwald, Brussels (BE); Jonathan Brunel, Brussels (BE)

(73) Assignee: Plastic Omnium Clean Energy Systems Research, Lyons (FR)

( * ) Notice: Subject to any disclaimer, the term of this patent is extended or adjusted under 35 U.S.C. 154(b) by 0 days.

(21) Appl. No.: 18/687,715

(22) PCT Filed: Sep. 2, 2022

(86) PCT No.: PCT/EP2022/074506
§ 371 (c)(1),
(2) Date: Feb. 28, 2024

(87) PCT Pub. No.: WO2023/031425
PCT Pub. Date: Mar. 9, 2023

(65) Prior Publication Data
US 2024/0332692 A1    Oct. 3, 2024

(30) Foreign Application Priority Data

Sep. 2, 2021 (LU) .................................. LU500615

(51) Int. Cl.
*H01M 50/209* (2021.01)
*H01M 10/613* (2014.01)
(Continued)

(52) U.S. Cl.
CPC ....... *H01M 50/209* (2021.01); *H01M 10/613* (2015.04); *H01M 10/6557* (2015.04);
(Continued)

(58) Field of Classification Search
CPC .......... H01M 10/613; H01M 10/6557; H01M 10/6565; H01M 50/209; H01M 50/227;
(Continued)

(56) References Cited

FOREIGN PATENT DOCUMENTS

| CN | 205609622 U | 9/2016 |
|---|---|---|
| CN | 113130962 A | 7/2021 |

(Continued)

OTHER PUBLICATIONS

International Search Report Issued Mar. 6, 2023, in PCT/EP2022/074506, filed on Sep. 2, 2022, 5 pages with English Translation.

*Primary Examiner* — James Lee
(74) *Attorney, Agent, or Firm* — Oblon, McClelland, Maier & Neustadt, L.L.P.

(57) ABSTRACT

A battery module includes a row of battery cells arranged parallel to each other, aligned along a longitudinal axis, and arranged at a distance from each other so that adjacent battery cells define a gap allowing a temperature control fluid to pass therethrough. A holding device includes a main body, a plurality of spacers and retaining means. Each spacer includes a mounting foot and a separator plate integrally formed with the mounting foot. The separator plate is arranged in the gap and configured to separate a first pass and a second pass of the temperature control fluid. The mounting feet are slidably mounted parallel to the longitudinal axis, defining a sliding connection. The retaining means includes axial clamping means which axially compresses an axial stop of the retaining means against a battery cell located at an axial end of the row of battery cells.

21 Claims, 4 Drawing Sheets

(51) Int. Cl.
    *H01M 10/6557*    (2014.01)
    *H01M 10/6565*    (2014.01)
    *H01M 50/227*     (2021.01)
    *H01M 50/244*     (2021.01)
    *H01M 50/264*     (2021.01)
    *H01M 50/291*     (2021.01)
    *H01M 50/293*     (2021.01)

(52) U.S. Cl.
    CPC ..... *H01M 10/6565* (2015.04); *H01M 50/227* (2021.01); *H01M 50/244* (2021.01); *H01M 50/264* (2021.01); *H01M 50/293* (2021.01)

(58) Field of Classification Search
    CPC ............. H01M 50/244; H01M 50/264; H01M 50/289–291; H01M 50/293
    See application file for complete search history.

(56) References Cited

FOREIGN PATENT DOCUMENTS

| | | |
|---|---|---|
| EP | 1 701 404 A1 | 9/2006 |
| JP | 2014-154401 A | 8/2014 |
| JP | 5672000 B2 | 2/2015 |

BATTERY MODULE FOR A MOTOR VEHICLE

CROSS-REFERENCE TO RELATED APPLICATIONS

The present application is a 35 U.S.C. § 371 national stage application of International patent application PCT/EP2022/074506, filed Sep. 2, 2022, which is based on and claims the benefit of priority to Luxembourg Application No. LU500615A, filed Sep. 2, 2021. The entire contents of these applications are incorporated herein by reference.

The invention relates to a battery module for a motor vehicle, a system comprising such a battery module, as well as a motor vehicle comprising such a system.

A motor vehicle battery module equipped with a row of battery cells is already known in the prior art, for example from each one of documents JPS 5 672 000 B2, CN 113 130 962 A, CN 205 609 622 U, EP 1 701 404 A1, and JP 2014 154 401 A.

In order to allow optimal operation, the battery cells must be temperature-controlled. For this, the battery cells are arranged with a gap therebetween, which is maintained by spacers. These spacers are provided with a mounting portion provided for receiving a battery and a wall in the form of a separator plate. The spacer, by virtue of this separator plate, makes it possible to form an air flow path between two battery cells.

However, the manufacture and assembly of this battery module are relatively complex, especially because each battery cell must be arranged inside a spacer. In addition, the spacers are relatively bulky, which makes their handling difficult during the mounting of the battery module.

The object of the invention is especially to simplify the assembly of a battery module.

To this end, the invention relates to a battery module for a motor vehicle, including:
- a row of battery cells arranged parallel to each other and aligned along a longitudinal axis X, the battery cells being arranged at a distance from each other so that the adjacent battery cells define a gap allowing temperature control fluid for the battery cells to pass therethrough,
- a holding device, including a main body, a plurality of spacers, and retaining means, each spacer including a mounting foot and a separator plate integrally formed with the mounting foot, the separator plate being arranged in the gap between two adjacent battery cells and configured to separate a first pass of temperature control fluid and a second pass of temperature control fluid, the mounting feet being slidably mounted parallel to the axis X on the main body in at least one row and thus defining a sliding connection therebetween, the retaining means comprising a first axial stop arranged at a first axial end of the row of battery cells and a second axial stop arranged at the second axial end of the row of battery cells, the retaining means comprising axial clamping means, which axially compress the second axial stop against the battery cell located at the second axial end of the row of battery cells, the second axial stop thus compressing the row of battery cells and the separator plates arranged therebetween against the first axial stop, the mounting feet comprising an axial clearance therebetween so that the row of battery cells and the separator plates arranged therebetween are kept fixedly clamped.

Thus, the assembly is simplified, because the holding device comprises the spacers mounted axially sliding. When axially clamped, the spacers can slide axially so as to avoid any clearance between each spacer and the adjacent battery cells. "Kept fixedly clamped" is understood to mean that there is no axial clearance between the separator plates and the battery cells. In other words, in a battery module in the assembled state, the temperature control fluid does not pass between the separator plates and the battery cells.

According to other optional features of the battery module taken either alone or in combination:
- The second axial stop is slidably mounted parallel to the axis X on the main body. Thus, the mounting and positioning of the second axial stop is carried out simply.
- The main body includes a translational guide rail, the mounting feet being slidably mounted on the translational guide rail. Thus, the mounting and positioning of the spacers is carried out simply.
- The second axial stop includes a mounting foot slidably mounted on the translational guide rail. Thus, the mounting and the positioning of the second axial stop are carried out simply, using the translational guide rail that was already used for the mounting and the positioning of the spacers.
- The axial clamping means comprise a first axial compression member, which is attached to the main body and compresses the second axial stop against the battery cell located at the second axial end of the row of battery cells. Thus, the axial compression effect is obtained in a particularly simple manner.
- The axial clamping means comprise a second axial compression member, which compresses the second axial stop against the battery cell located at the second axial end of the row of battery cells, the second axial compression member and each spacer being interconnected so that their connection is free to translate parallel to the axis X. Thus, the axial compression effect is obtained and the positioning of the spacers during assembly is ensured in a simple manner.
- Each spacer includes a head integrally formed with the separator plate, the head being opposite the mounting foot and being connected with the second axial compression member. Thus, during assembly, the keeping in place of the battery cells by means of the spacers is ensured in a simple manner.
- The head of each spacer includes a guide hole oriented parallel to the axis X, the second axial compression member passing through the guide hole of each spacer. Thus, during assembly, the keeping in place of the battery cells by means of the spacers is ensured in a particularly simple manner.
- The second axial compression member includes an element for being retained axially on the wall of the battery cell opposite the first axial stop. Thus, the axial compression effect is obtained in a particularly simple manner, and the rigidity of the assembly is improved.
- The second axial compression member is retained axially directly on the first axial stop. Thus, the axial compression effect is obtained in a particularly simple manner, and the rigidity of the assembly is improved.
- The first axial stop is integrally formed with the main body. Thus, the mounting is simplified, because the number of elements to be assembled is reduced.
- The second axial stop and the spacers are identical. Thus, the design and mounting are simplified and the manufacturing costs are reduced, especially because it is not necessary to design a specific part to form the second axial stop.

The first axial compression member is bearing against the mounting foot of the second axial stop. Thus, an axial compression force can be applied without blocking the axial thermal expansion of the battery cells.

Each spacer includes a passage for temperature control fluid, arranged in the separator plate at the end opposite the mounting foot, and allowing temperature control fluid to pass between the first pass and the second pass. Thus, the presence of such a passage makes it possible to limit head losses by optimizing the flow of the temperature control fluid between the first pass and the second pass. Preferably, the passage for temperature control fluid is a hole for the passage of temperature control fluid.

The mounting feet include, at their axial ends forming an axial clearance therebetween, a complementary shape forming a baffle therebetween for the temperature control fluid. Thus, due to the presence of a baffle, the leakage of temperature control fluid from the desired flow path between the first pass and the second pass is limited.

The baffle comprises a longitudinal portion extending parallel to the axis X. Thus, such a longitudinal portion makes it possible not only to guarantee the sliding of the spacers therebetween, but also to ensure that the clearance created between the mounting feet during assembly with the battery cells does not increase the minimum flow area of the baffle, through which the temperature control fluid passes, beyond a threshold predefined by the longitudinal portion. As a result, the leakage of temperature control fluid from the desired flow path between the first pass and the second pass is limited.

The main body includes at least one hole for the passage of temperature control fluid, which has a fan mounted thereupon. Thus, the mounting of the one or more fans is carried out in a simple and economical manner.

The main body is made of plastic material, preferably of thermoplastic material, more preferentially of polypropylene. Thus, the manufacture of the main body is easy and inexpensive.

The spacers are made of plastic material, preferably of thermoplastic material, more preferentially of polypropylene or of thermoplastic polyurethane. Thus, the manufacture of spacers is easy and inexpensive.

The temperature control fluid is gaseous, preferably the temperature control fluid is air. Thus, in use, the battery module is not weighed down by the temperature control fluid as is the case with a liquid temperature control fluid, which makes it possible to limit the mass of the motor vehicle and thus the fuel consumption of the latter.

The invention also relates to a system comprising a battery module as previously defined and a housing, which contains the battery module, the temperature control fluid circulating in a closed circuit within the housing. Thus, because the temperature control fluid circuit is closed, the entry of external elements, such as for example dust or moisture, into the temperature control fluid circuit is avoided, which increases the service life of the system.

According to other optional features of the system, taken either alone or in combination:

The housing is sealed to the temperature control fluid. Thus, the leakage of the temperature control fluid from the housing is prevented.

The housing is sealed against moisture and dust, for example air-tight. Thus, the efficacy of the temperature control is maintained over time, especially because the heat exchange between the temperature control fluid and the battery cells is not disrupted by the deposition of dust or condensation water, or even frost, resulting from moisture. Because the entry of dust or moisture into the housing is prevented, this increases the service life of the system.

The temperature control fluid circulates along a flow path passing through a fan, a heat exchanger, the first pass, and the second pass. Thus, the flow path is optimized.

The invention finally relates to a motor vehicle comprising a system as previously defined.

BRIEF DESCRIPTION OF THE FIGURES

The invention will be better understood upon reading the following description, which is provided merely as example and with reference to the appended drawings, wherein.

DETAILED DESCRIPTION

In all the figures, the same references relate to the same elements.

In this detailed description, the following embodiments are examples. Although the description refers to one or more embodiments, this does not mean that the features apply only to a single embodiment. Simple features of different embodiments can also be combined and/or interchanged to provide other embodiments.

Figure 1:
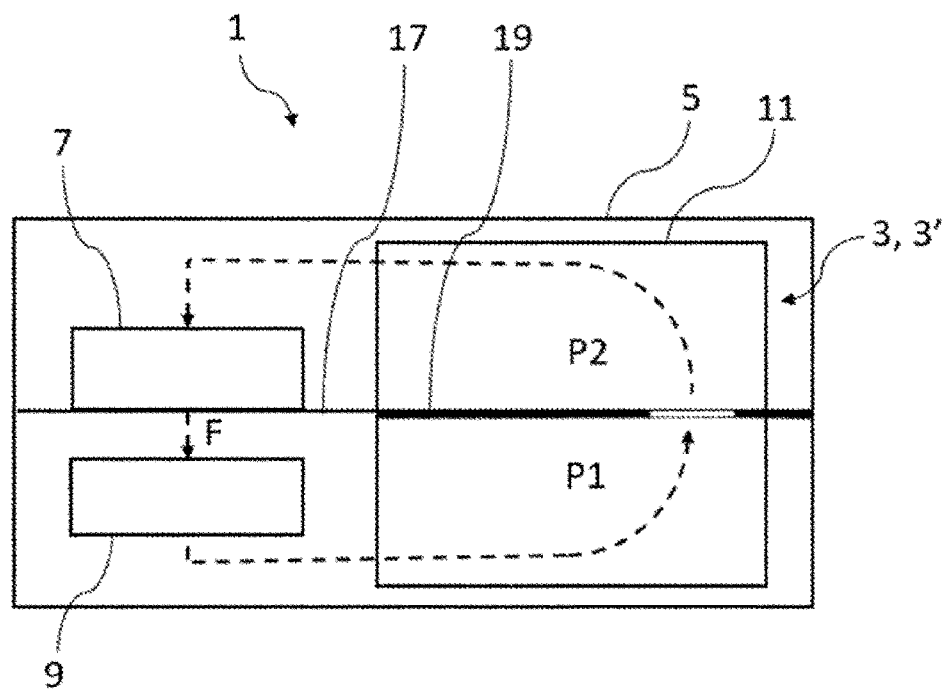
FIG. 1 is a schematic view of a system comprising a battery module according to one embodiment.

FIG. 1 schematically depicts a system 1 comprising a battery module 3 for a motor vehicle and a housing 5. The system 1 is thus configured to be mounted in a motor vehicle (not shown).

The housing 5 contains the battery module 3, a temperature control fluid F circulating in a closed circuit within the housing 5. The housing 5 is sealed to the temperature control fluid F, which is air in this example. In addition, the housing 5 is sealed to moisture and dust. The housing 5 also contains a fan 7 and a heat exchanger 9.

Figure 2:
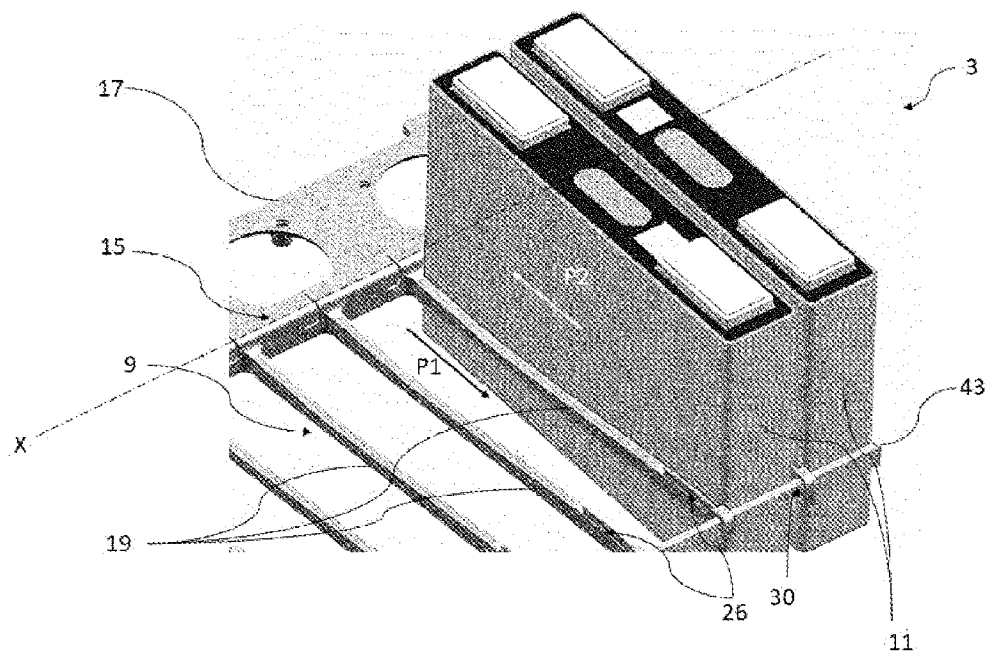
FIG. 2 is a perspective view of a part of the battery module according to a first alternative of the embodiment depicted in FIG. 1.
Figure 3:
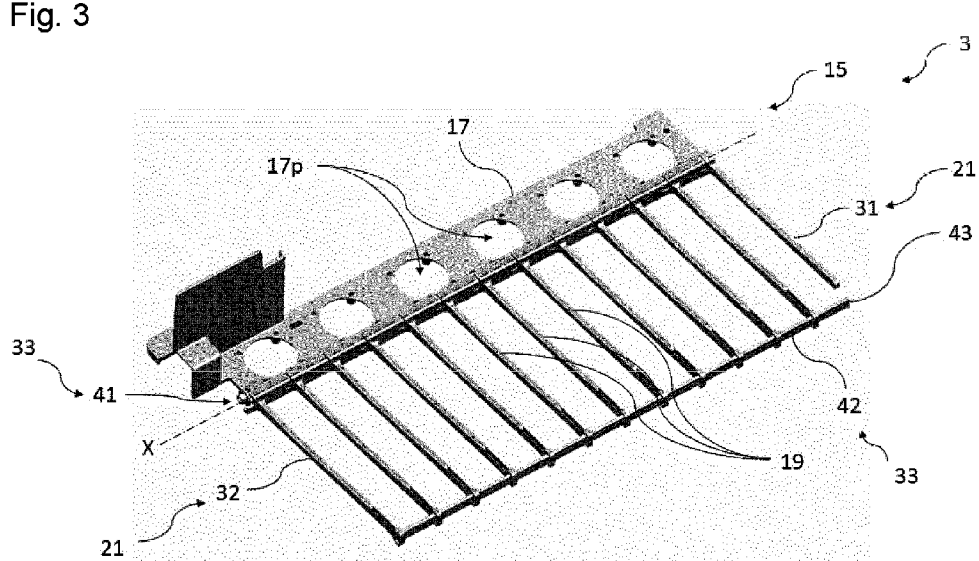
FIG. 3 is a perspective view of a part of the battery module according to the first alternative of the embodiment depicted in FIG. 1.
Figure 4:
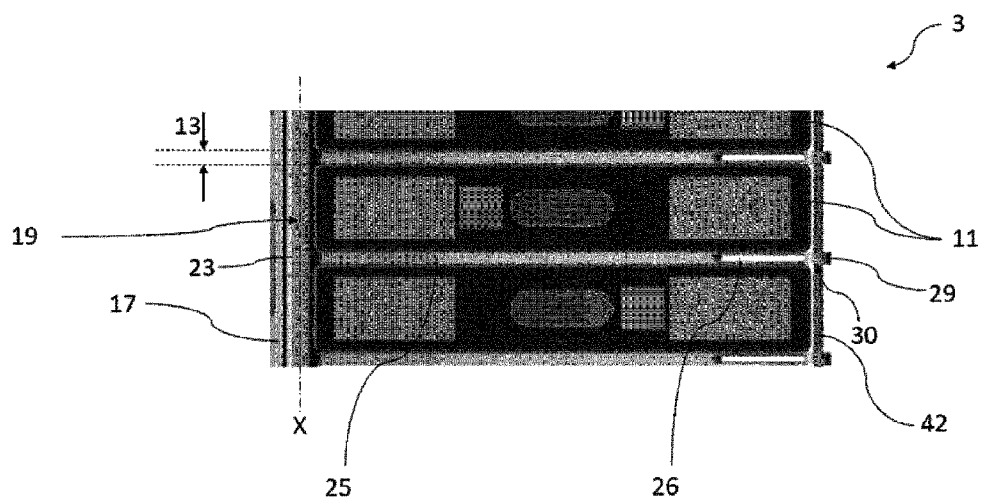
FIG. 4 is a top view of a part of the battery module according to the first alternative of the embodiment depicted in FIG. 1.
Figure 5:
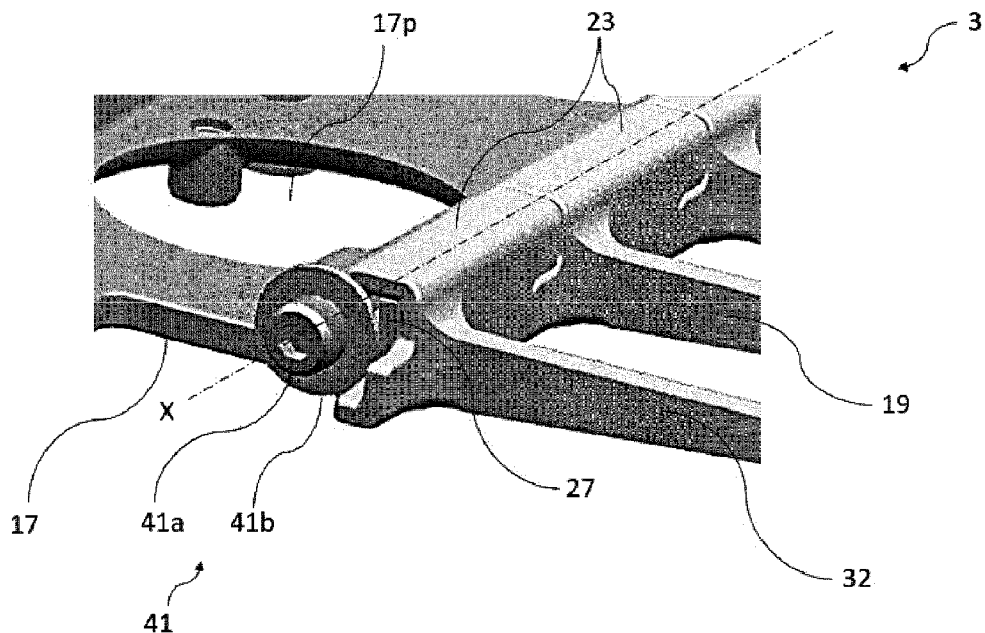
FIG. 5 is a perspective view of a part of the battery module according to the first alternative of the embodiment depicted in FIG. 1.
Figure 7:
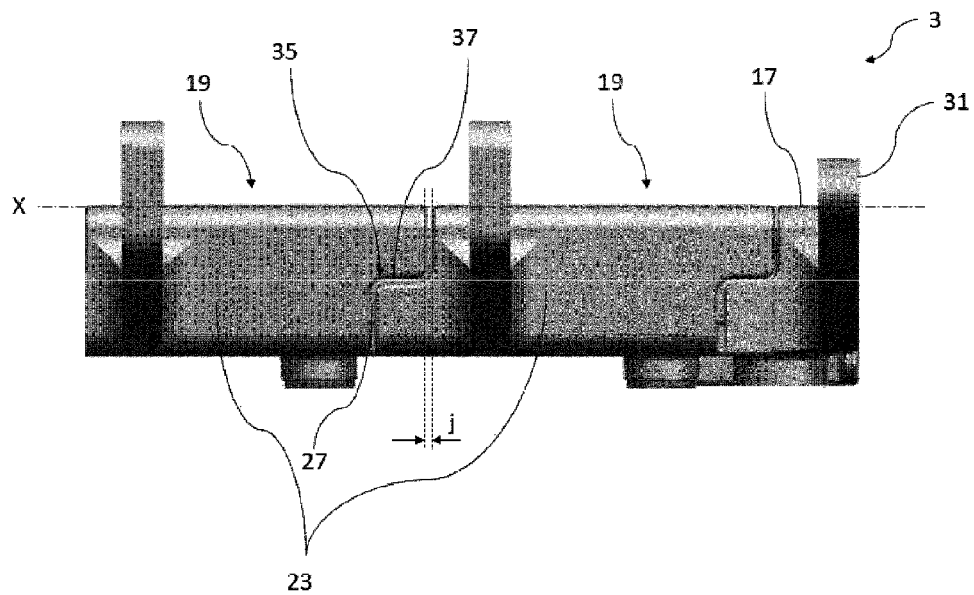
FIG. 7 is a front view of a part of the battery module according to the first alternative of the embodiment depicted in FIG. 1.

As shown in FIGS. 2 and 4, the battery module 3 includes a row of battery cells 11 arranged parallel to each other and aligned along a longitudinal axis X. The battery cells 11 being arranged at a distance from each other so that the adjacent battery cells 11 define therebetween a gap 13 allowing temperature control fluid F for the battery cells 11 to pass therethrough, as shown in FIG. 4. In FIG. 2, only a part of the battery cells 11 is depicted to facilitate understanding of the structure of the battery module 3. In FIGS. 3, 5 and 7, no battery cells 11 are depicted to facilitate understanding of the structure of the battery module 3.

The battery module 3 also includes a holding device 15, depicted especially in FIG. 3, including a main body 17, a plurality of spacers 19, and retaining means 21. It should be understood that in a battery module 3 in the assembled state, each spacer 19 is arranged between two battery cells 11. Thus, in this example, the battery module 3 includes twelve battery cells 11. However, this number is variable depending on the arrangement of the battery cells 11 and their electrical configuration in series and/or in parallel. The battery module 3 is configured to deliver an output voltage, which in this example is 48 V.

In this example, the main body 17 is made of plastic material, preferably of thermoplastic material, more preferentially of polypropylene. The main body 17 also includes at least one hole 17*p* for the passage of temperature control fluid F, which has a fan 7 mounted thereupon. In this example, the main body includes six passage holes 17*p*, the fan 7 including an axial ventilation sub-module for each passage hole 17*p*, and thus including six axial ventilation sub-modules.

Additionally, in this example, the spacers 19 are made of plastic material, preferably of thermoplastic material, more preferentially of polypropylene or of thermoplastic polyurethane.

Each spacer 19 includes a mounting foot 23 and a separator plate 25 integrally formed with the mounting foot 23, the separator plate 25 being arranged in the gap 13 between two adjacent battery cells 11 and configured to separate a first pass P1 of temperature control fluid F and a second pass P2 of temperature control fluid F.

Thus, in this example and as shown in FIG. 1, the temperature control fluid F circulates, in a closed circuit, along a flow path passing through the fan 7, the heat exchanger 9, the first pass P1, and the second pass P2.

Each spacer 19 also includes a passage for temperature control fluid F, in this example a hole 26 for the passage of temperature control fluid F, arranged in the separator plate 25 at the end opposite the mounting foot 23, and allowing temperature control fluid F to pass between the first pass P1 and the second pass P2.

Figure 6:
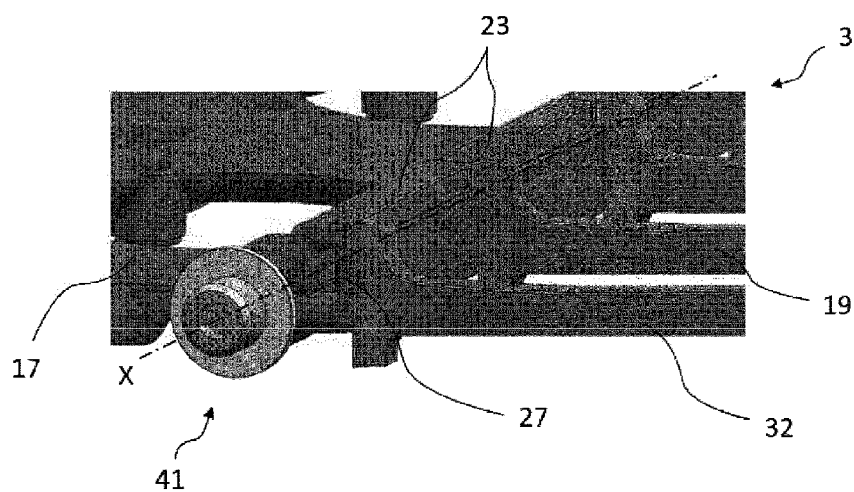
FIG. 6 is a view similar to the view depicted in FIG. 5 showing an alternative embodiment of the slidable mounting of the mounting feet on the translational guide rail.

The mounting feet 23 are slidably mounted parallel to the axis X on the main body 17 in at least one row and thus define a sliding connection therebetween. More specifically, in this example and as shown in FIG. 5, the main body 17 includes a translational guide rail 27, the mounting feet 23 being slidably mounted on the translational guide rail 27. In this example, the slidable mounting of the mounting feet 23 on the translational guide rail 27 is carried out by lining them up in a direction parallel to the axis X of the mounting feet 23 on the translational guide rail 27. In an alternative embodiment depicted in FIG. 6, the slidable mounting of the mounting feet 23 on the translational guide rail 27 is carried out by placing the mounting feet 23 straddling the translational guide rail 27 in a direction perpendicular to the axis X.

As shown in FIG. 4, each spacer 19 further includes a head 29 integrally formed with the separator plate 25, the head 29 being opposite the mounting foot 23. In this example, the head 29 includes a guide hole 30 oriented parallel to the axis X.

The retaining means 21 comprise a first axial stop 31 arranged at a first axial end of the row of battery cells 11 and a second axial stop 32 arranged at the second axial end of the row of battery cells 11. In this example, the first axial stop 31 is integrally formed with the main body 17, and is provided in the form of a plate arranged parallel to the spacers 19.

The retaining means 21 also comprise axial clamping means 33, which axially compress the second axial stop 32 against the battery cell 11 located at the second axial end of the row of battery cells 11, the second axial stop 32 thus compressing the row of battery cells 11 and the separator plates 25 arranged therebetween against the first axial stop 31, the mounting feet 23 comprising an axial clearance j therebetween so that the row of battery cells 11 and the separator plates 25 arranged therebetween are kept fixedly clamped.

In this example, as shown in FIGS. 3 and 5, the second axial stop 32 and the spacers 19 are identical. Thus, the second axial stop 32 is slidably mounted parallel to the axis X on the main body 17, and the second axial stop 32 includes a mounting foot 23 slidably mounted on the translational guide rail 27.

The mounting feet 23 include, at their axial ends forming an axial clearance j therebetween, a complementary shape forming a baffle 35 therebetween for the temperature control fluid F. As shown in FIG. 7, the baffle 35 comprises a longitudinal portion 37 extending parallel to the axis X. The longitudinal portion 37 thus defines a flow area for the temperature control fluid F, which is predefined and is not affected by the spacers 19 sliding relative to each other.

The axial clamping means 33 comprise a first axial compression member 41, which is attached to the main body 17 and compresses the second axial stop 32 against the battery cell 11 located at the second axial end of the row of battery cells 11. In this example, the first axial compression member 41 bears against the mounting foot 23 of the second axial stop 32. More specifically, in this example, as shown in FIG. 5, the first axial compression member 41 is formed by a screw 41*a* including a washer 41*b* bearing against the mounting foot 23 of the second axial stop 32.

The axial clamping means 33 also comprise a second axial compression member 42, which compresses the second axial stop 32 against the battery cell 11 located at the second axial end of the row of battery cells 11, the second axial compression member 42 and each spacer 19 being interconnected so that their connection is free to translate parallel to the axis X. More specifically, in this example, the head 29 of each spacer 19 is connected with the second axial compression member 42, the second axial compression member 42 passing through the guide hole 30 of each spacer 19. In this example, the second axial compression member 42 includes an element 43 for being retained axially on the wall of the battery cell 11 opposite the first axial stop 31. Alternatively and according to one alternative not shown, the second axial compression member is retained axially directly on the first axial stop. In the above-mentioned alternative, the second axial compression member is a threaded rod.

Figure 8:
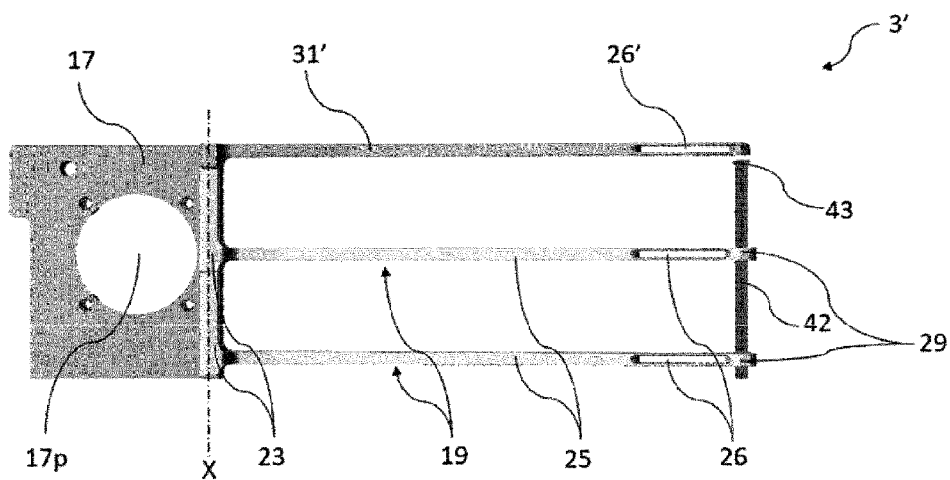
FIG. 8 is a top view of a part of the battery module according to a second alternative of the embodiment depicted in FIG. 1.

FIG. 8 depicts a detail of an example of a battery module 3' according to a second alternative. In FIG. 8, no battery cells 11 are depicted to facilitate understanding of the structure of the battery module 3'. This battery module 3' according to the second alternative differs from the battery module 3 according to the previously described first alternative in its first axial stop 31'. Indeed, the first axial stop 31' according to the second alternative, like the first axial stop 31 according to the first alternative, is integrally formed with the main body 17, and is provided in the form of a plate arranged parallel to the spacers 19. However, the first axial stop 31' according to the second alternative differs from the first axial stop 31 according to the first alternative in that it includes a passage for temperature control fluid F, in this example a hole 26' for the passage of temperature control fluid F, arranged in the first axial stop 31' at its end opposite the end connected to the main body 17, and allowing temperature control fluid F to pass between the first pass P1 and the second pass P2.

The invention is not limited to the embodiments presented, and other embodiments will become clearly apparent to the person skilled in the art. It is especially possible to reverse the direction of the temperature control fluid so that the temperature control fluid F circulates, in a closed circuit, along a flow path passing through the heat exchanger 9, the fan 7, the second pass P2, and the first pass P1.

LIST OF REFERENCES

1: system
3, 3': battery module
5: housing
7: fan
9: heat exchanger
11: battery cell
13: gap
15: holding device
17: main body
17p: passage hole
19: spacer
21: retaining means
23: mounting foot
25: separator plate
26, 26': passage hole
27: translational guide rail
29: head
30: guide hole
31, 31': first axial stop
32: second axial stop
33: axial clamping means
35: baffle
37: longitudinal portion
41: first axial compression member
41a: screw
41b: washer
42: second axial compression member
43: axial retaining element
P1: first pass
P2: second pass
j: axial clearance

The invention claimed is:

1. A battery module, comprising:
a row of battery cells arranged parallel to each other and aligned along a longitudinal axis, the battery cells being arranged at a distance from each other so that adjacent battery cells define a gap allowing a temperature control fluid for the battery cells to pass therethrough; and
a holding device including a main body, a plurality of spacers and retaining means, wherein:
each spacer includes a mounting foot and a separator plate integrally formed with the mounting foot, the separator plate being arranged in the gap between two adjacent battery cells and configured to separate a first pass of the temperature control fluid and a second pass of the temperature control fluid,
the mounting feet are slidably mounted parallel to the longitudinal axis on the main body in at least one row, thus defining a sliding connection therebetween,
the retaining means comprises a first axial stop arranged at a first axial end of the row of battery cells and a second axial stop arranged at the second axial end of the row of battery cells, and
the retaining means comprises axial clamping means which axially compress the second axial stop against the battery cell located at the second axial end of the row of battery cells, the second axial stop thus compressing the row of battery cells and the separator plates arranged therebetween against the first axial stop, the mounting feet comprising an axial clearance therebetween so that the row of battery cells and the separator plates arranged therebetween are kept fixedly clamped.

2. The battery module according to claim 1, wherein the second axial stop is slidably mounted parallel to the longitudinal axis on the main body.

3. The battery module according to claim 1, wherein the main body includes a translational guide rail, and the mounting feet is slidably mounted on the translational guide rail.

4. The battery module according to claim 3, wherein the second axial stop includes a mounting foot slidably mounted on the translational guide rail.

5. The battery module according to claim 1, wherein the axial clamping means comprises a first axial compression member which is attached to the main body and compresses the second axial stop against the battery cell located at the second axial end of the row of battery cells.

6. The battery module according to claim 1, wherein the axial clamping means comprises a second axial compression member which compresses the second axial stop against the battery cell located at the second axial end of the row of battery cells, the second axial compression member and each spacer being interconnected in such a way that their connection is free to translate parallel to the longitudinal axis.

7. The battery module according to claim 6, wherein each spacer includes a head integrally formed with the separator plate, and the head is opposite the mounting foot and connected with the second axial compression member.

8. The battery module according to claim 7, wherein the head of each spacer includes a guide hole oriented parallel to the longitudinal axis, and the second axial compression member passes through the guide hole of each spacer.

9. The battery module according to claim 6, wherein the second axial compression member includes an element for being retained axially on the wall of the battery cell opposite the first axial stop or is retained axially directly on the first axial stop.

10. The battery module according to claim 1, wherein the first axial stop is integrally formed with the main body.

11. The battery module according to claim 1, wherein the second axial stop and the spacers are identical.

12. The battery module according to claim 11, wherein the first axial compression member bears against the mounting foot of the second axial stop.

13. The battery module according to claim 1, wherein each spacer includes a passage for the temperature control fluid, arranged in the separator plate at the end opposite the mounting foot, and allowing the temperature control fluid to pass between the first pass and the second pass.

14. The battery module according to claim 1, wherein the mounting feet include, at their axial ends forming an axial clearance therebetween, a complementary shape forming a baffle therebetween for the temperature control fluid.

15. The battery module according to claim 14, wherein the baffle comprises a longitudinal portion extending parallel to the longitudinal axis.

16. The battery module according to claim 1, wherein the main body includes at least one hole for the passage of the temperature control fluid which has a fan mounted thereupon.

17. The battery module according to claim 1, wherein the main body is made of plastic material, preferably of thermoplastic material, more preferentially of polypropylene, and the spacers are made of plastic material, preferably of thermoplastic material, more preferentially of polypropylene or of thermoplastic polyurethane.

18. The battery module according to claim 1, wherein the temperature control fluid is gaseous, and preferably the temperature control fluid is air.

19. A system comprising:
the battery module according to claim 1; and
a housing which contains the battery module,
wherein the temperature control fluid circulates in a closed circuit within the housing.

20. The system according to claim 19, wherein the temperature control fluid circulates along a flow path passing through a fan, a heat exchanger, the first pass and the second pass.

21. A motor vehicle comprising the system according to claim 19.

* * * * *